US008877857B2

(12) United States Patent
Tokimune et al.

(10) Patent No.: US 8,877,857 B2
(45) Date of Patent: Nov. 4, 2014

(54) POLAR GROUP-CONTAINING COPOLYMER, RUBBER COMPOSITION AND STUDLESS TIRE

(75) Inventors: Ryuichi Tokimune, Kobe (JP); Kazuo Hochi, Kobe (JP); Katsumi Terakawa, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 400 days.

(21) Appl. No.: 13/257,738

(22) PCT Filed: Apr. 6, 2010

(86) PCT No.: PCT/JP2010/056217
§ 371 (c)(1),
(2), (4) Date: Oct. 24, 2011

(87) PCT Pub. No.: WO2010/116988
PCT Pub. Date: Oct. 14, 2010

(65) Prior Publication Data
US 2012/0095153 A1    Apr. 19, 2012

(30) Foreign Application Priority Data

Apr. 7, 2009  (JP) ............................ 2009-093407
Jul. 14, 2009 (JP) ............................ 2009-166085
Dec. 10, 2009 (JP) ............................ 2009-281011

(51) Int. Cl.
| | | |
|---|---|---|
| C08F 36/04 | (2006.01) | |
| C08L 7/00 | (2006.01) | |
| C08F 236/04 | (2006.01) | |
| C08L 19/00 | (2006.01) | |
| B60C 1/00 | (2006.01) | |
| C08F 216/02 | (2006.01) | |
| C08L 9/00 | (2006.01) | |
| C08K 3/36 | (2006.01) | |
| C08K 5/548 | (2006.01) | |

(52) U.S. Cl.
CPC .............. *C08L 7/00* (2013.01); *C08F 216/02* (2013.01); *C08L 9/00* (2013.01); *C08F 236/04* (2013.01); *C08L 19/006* (2013.01); *C08K 3/36* (2013.01); *C08K 5/548* (2013.01); *C08F 36/04* (2013.01); *B60C 1/0016* (2013.01)
USPC .......... 524/526; 524/492; 526/335; 526/279; 526/310; 526/338; 526/340.2; 526/75; 526/90

(58) Field of Classification Search
CPC ......... B60C 1/0016; C08F 36/04; C08F 7/00; C08L 19/006
USPC .......... 524/492, 526; 526/335, 279, 310, 338, 526/340.2, 75, 90
See application file for complete search history.

(56) References Cited

U.S. PATENT DOCUMENTS

| | | |
|---|---|---|
| 4,999,405 A | 3/1991 | Abraham |
| 6,114,432 A | 9/2000 | Takagishi et al. |
| 2003/0065083 A1 | 4/2003 | Sone et al. |
| 2003/0125467 A1* | 7/2003 | Akema et al. .............. 525/208 |
| 2006/0270492 A1 | 11/2006 | Higuchi et al. |
| 2007/0111823 A1 | 5/2007 | Higuchi et al. |

FOREIGN PATENT DOCUMENTS

| | | |
|---|---|---|
| EP | 0 870 786 A1 | 10/1998 |
| EP | 1 092 735 A1 | 4/2001 |
| EP | 1 099 710 A1 | 5/2001 |
| JP | 46-31972 B1 | 9/1971 |
| JP | 58-1711 A | 1/1983 |
| JP | 1-110545 A | 4/1989 |
| JP | H01-110545 * | 4/1989 |
| JP | 5-503115 A | 5/1993 |
| JP | 9-208632 A | 8/1997 |
| JP | 9-208633 A | 8/1997 |
| JP | 2000-344955 A | 12/2000 |
| JP | 2001-114939 A | 4/2001 |
| JP | 2001-139603 A | 5/2001 |
| JP | 2002-309038 A | 10/2002 |
| JP | 2005-82735 A | 3/2005 |
| JP | 2006-326301 A | 12/2006 |

OTHER PUBLICATIONS

Kim et al., "Hydroxylation of Polyisoprene via Addition of Haloacetic Acids to the Double Bond", Macromolecules, vol. 24, No. 24, 1991 pp. 6505-6511.
A full English machine translation of JP-2001-114939-A, dated Apr. 24, 2001.
A full English machine translation of JP-2001-139603-A, dated May 22, 2001.
A full English machine translation of JP-2005-82735-A, dated Mar. 31, 2005.
A full English machine translation of JP-9-208632-A, dated Aug. 12, 1997.
A full English machine translation of JP-9-208633-A, dated Aug. 12, 1997.
A partial English translation of JP-1-110545-A, dated Apr. 27, 1989.
International Search Report for PCT/JP2010/056217 dated Jun. 29, 2010.

* cited by examiner

*Primary Examiner* — James J Seidleck
*Assistant Examiner* — Deve E Valdez
(74) *Attorney, Agent, or Firm* — Birch, Stewart, Kolasch & Birch, LLP

(57) ABSTRACT

The present invention provides a polar group-containing copolymer which can provide a rubber composition and a winter tire achieving the abrasion resistance, performance on ice, and handling stability on dry roads in a balanced manner. The present invention relates to a polar group-containing copolymer obtainable by copolymerizing a conjugated diene compound and a polar group-containing vinyl compound, wherein the polar group-containing vinyl compound is a compound that has a polymerizable unsaturated bond and a polar group, wherein any one of carbon atoms forming the polymerizable unsaturated bond and a carbon atom linked to the polar group are connected to each other via at least one carbon atom, and wherein a cis content of the double bond portion of the conjugated diene compound in the polar group-containing copolymer is 80 mol % or more.

11 Claims, No Drawings

POLAR GROUP-CONTAINING COPOLYMER, RUBBER COMPOSITION AND STUDLESS TIRE

TECHNICAL FIELD

The present invention relates to a polar group-containing copolymer, and a rubber composition and a winter tire (studless tire) containing the copolymer.

BACKGROUND ART

Winter tires (studless tires) are now being used as pneumatic tires for driving on ice and snow roads in many cases instead of conventional spike tires, and further improvement of performance on ice is much more required. For improved performance on ice and snow, the glass transition temperature (Tg) is preferably lowered so that the elastic modulus at low temperatures (the term "low temperatures" herein means temperatures upon driving on ice and snow, and it is in the range of about −20° C. to 0° C.) is set to be low. Thus, for example, high cis-1,4-polybutadiene is widely used because it has a high cis content and a low Tg and, if it is used for tread rubber of tires, it provides excellent properties such as abrasion resistance and fatigue properties.

In general, however, the elastic modulus at high temperatures tends to be lower as the elastic modulus at low temperatures is reduced; thus, disadvantageously, conventional winter tires are poor in handling stability upon driving on dry roads.

On the other hand, low cis-1,4-polybutadiene, which is mainly obtained by living anion polymerization using an alkyllithium catalyst, improves performance on ice especially in tread rubber containing silica, for example, because the molecular weight thereof is easily controlled and the terminals thereof are relatively easily modified; however, it has a disadvantage in abrasion resistance.

In order to solve the aforementioned problem of reduction in elastic modulus at high temperatures, an experiment has been performed in which, in a silica-containing rubber composition, a specific polar group is attached to the rubber to provide an affinity for silica and to increase dispersibility of silica, so that the reduction in elastic modulus at high temperatures is suppressed. For example, Patent Document 1 discloses an experiment in which rubber is modified by an organosilicon compound containing an amino group and alkoxy group so as to increase the affinity for silica, but the effect is insufficient.
Patent Document 1: JP 2000-344955 A

SUMMARY OF THE INVENTION

An object of the present invention is to provide a polar group-containing copolymer which can solve the above problems and which can give a rubber composition and a winter tire achieving the abrasion resistance, performance on ice, and handling stability on dry roads in a balanced manner.

Means for Solving the Problems

The present inventors have studied so as to achieve good balance of excellent abrasion resistance owing to a high cis content, excellent performance on ice owing to main-chain or terminal modification, and handling stability on dry roads. Then, they have found that use of a polymer obtainable by copolymerizing a conjugated diene compound and a specific polar group-containing vinyl compound can provide better abrasion resistance and dispersibility of silica than usual and the aforementioned properties can be achieved in a balanced manner, and have thereby completed the present invention. The present inventors have further found that introduction of a large amount of the polar group-containing vinyl compound into end portions can further improve dispersibility of silica, so that the balance of these properties is further improved.

The present invention relates to a polar group-containing copolymer obtainable by copolymerizing a conjugated diene compound and a polar group-containing vinyl compound, wherein the polar group-containing vinyl compound is a compound that has a polymerizable unsaturated bond and a polar group, wherein any one of carbon atoms forming the polymerizable unsaturated bond and a carbon atom linked to the polar group are connected to each other via at least one carbon atom, and wherein the a cis content of a double bond portion of the conjugated diene compound in the polar group-containing copolymer is 80 mol % or more.

In the polar group-containing copolymer, the polar group is preferably a hydroxy group, —NR$_2$, or a group represented by —Si(OR)$_k$(R)$_{3-k}$ wherein Rs each are hydrogen or a C1-C8 hydrocarbon group and may be the same as or different from each other; and k is an integer of 1, 2, or 3.

In the polar group-containing copolymer, the polar group-containing vinyl compound is preferably a compound represented by formula (I):

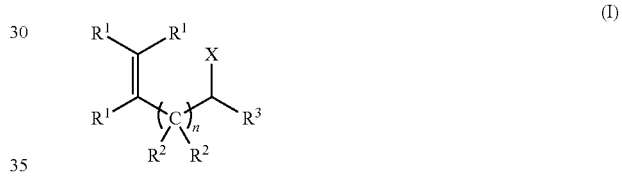

wherein R$^1$s each are hydrogen, a vinyl group, or a C1-C3 aliphatic hydrocarbon group, and may be the same as or different from each other; R$^2$s each are hydrogen or a C1-C3 aliphatic hydrocarbon group and may be the same as or different from each other; R$^3$ is hydrogen or a C1-C8 aliphatic or alicyclic hydrocarbon group; X is a hydroxy group, —NR$_2$ as defined above, or a group represented by —Si(OR)$_k$(R)$_{3-k}$ as defined above; n is an integer of 1 to 10; and the R$^1$, R$^2$, R$^3$, a carbon atom linked to the R$^2$, and/or a carbon atom linked to the R$^3$ may be bonded to each other to form a ring structure.

It is preferred that the polar group-containing copolymer comprises: 0.1 to 20% by mass of a structural unit A comprising: 50% by mass or less of a unit derived from the conjugated diene compound and 50% by mass or more of a unit derived from the polar group-containing vinyl compound; and 80 to 99.9% by mass of a structural unit B comprising: 60% by mass or more of a unit derived from the conjugated diene compound and 40% by mass or less of a unit derived from the polar group-containing vinyl compound, and the polar group-containing copolymer has the structural unit A at its end.

The polar group-containing copolymer is preferably obtainable by reacting the polar group-containing vinyl compound with an active end of an active end-containing copolymer that is obtainable by copolymerizing the conjugated diene compound and the polar group-containing vinyl compound using a transition metal-containing compound as a catalyst.

The polar group-containing copolymer preferably has a weight average molecular weight of $1.0 \times 10^3$ to $2.0 \times 10^6$ and a content of the polar group-containing vinyl compound of 0.03 to 40% by mass. Further, the conjugated diene compound is preferably 1,3-butadiene and/or isoprene.

The polar group-containing copolymer is preferably obtainable by reacting, before copolymerization, the polar group-containing vinyl compound with a compound represented by formula (II):

wherein M is aluminum, boron, silicon, or titanium; $R^4$s each are a C1-C8 aliphatic or alicyclic hydrocarbon group, a C1-C8 aliphatic or alicyclic alkoxy group, or a halogen, and may be the same as or different from each other; and m is an integer of 3 or 4, to produce a reaction product, and copolymerizing the obtained reaction product with the conjugated diene compound. Further, the polar group-containing copolymer is preferably obtainable by copolymerization using a lanthanide-, Ti-, Co-, or Ni-containing compound as a catalyst, and an Al- or B-containing compound as a promoter.

The present invention relates to a rubber composition comprising a diene rubber ingredient, the polar group-containing copolymer, and silica. In the rubber composition, it is preferred that an amount of the silica is 5 to 150 parts by mass relative to 100 parts by mass of a total of rubber ingredients, and an amount of the polar group-containing copolymer is 5 to 90% by mass in 100% by mass of a total of rubber ingredients.

The rubber composition preferably further comprises carbon black in an amount of 5 to 150 parts by mass relative to 100 parts by mass of a total of rubber ingredients.

The present invention also relates to a winter tire (studless tires) produced using the rubber composition.

Effects of the Invention

The present invention provides a polar group-containing copolymer obtained by copolymerizing a specific polar group-containing vinyl compound with a conjugated diene compound. Thus, a rubber composition and a winter tire using the polar group-containing copolymer can simultaneously achieve the abrasion resistance, performance on ice, and handling stability on dry roads in a balanced manner.

MODES FOR CARRYING OUT THE INVENTION

<Polar Group-Containing Copolymer>

The polar group-containing copolymer of the present invention is obtainable by copolymerizing a conjugated diene compound and a polar group-containing vinyl compound. Further, the polar group-containing vinyl compound is a compound which has a polymerizable unsaturated bond and a polar group, in which any one of carbon atoms forming the polymerizable unsaturated bond and a carbon atom linked to the polar group are connected to each other via at least one carbon atom. That is, if the polar group-containing vinyl compound is one represented by formula (I), it has a double bond (polymerizable unsaturated bond) and X (polar group), and the carbon atom which is one of the two carbon atoms forming the double bond and which is linked to $R^1$ and C and the carbon atom linked to X are connected to each other via n Cs (at least one carbon atom) of "—$(C(R^2)_2)_n$—". Furthermore, the cis content of the double bond portion of the conjugated diene compound in the polar group-containing copolymer is 80 mol % or more.

The number of the polymerizable unsaturated bond and the number of the polar group each may be one, or may be two or more, in the polar group-containing vinyl compound.

The polymerizable unsaturated bond is not particularly limited, and a polymerizable double bond is preferable. The polar group is not particularly limited, and examples thereof include —$NR_2$ (Rs each are hydrogen or a C1-C8 hydrocarbon group, and may be the same as or different from each other, for example, an amino group, monoalkylamino group, or dialkylamino group), an imino group, nitrile group, ammonium group, imido group, amido group, hydrazo group, azo group, diazo group, hydroxy group, carboxyl group, carbonyl group, oxycarbonyl group, sulfide group, sulfonyl group, thiocarbonyl group, and a group represented by —$Si(OR)_k(R)_{3-k}$ (Rs each are hydrogen or a C1-C8 hydrocarbon group and may be the same as or different from each other; and k is an integer of 1, 2, or 3). Particularly preferable are a hydroxy group (—OH), —$NR_2$, and a group represented by —$Si(OR)_k(R)_{3-k}$ (e.g. trialkoxysilyl group). In this case, the abrasion resistance, performance on ice, and handling stability on dry roads are simultaneously achieved in a balanced manner.

In the groups represented by —$NR_2$ and —$Si(OR)_k(R)_{3-k}$, the C1-C8 hydrocarbon group as R is not particularly limited. Examples thereof include alkyl groups such as a methyl group, ethyl group, n-propyl group, isopropyl group, n-butyl group, iso-butyl group, sec-butyl group, tert-butyl group, pentyl group, and hexyl group. Specific examples of the group represented by —$Si(OR)_k(R)_{3-k}$ include a trimethoxysilyl group, triethoxysilyl group, triisopropoxysilyl group, methyldimethoxysilyl group, methyldiethoxysilyl group, and dimethylethoxysilyl group.

The polar group-containing vinyl compound is preferably a compound represented by formula (I) below; in particular, groups represented by the following formula (I-1) and/or (I-2) can be suitably used. These compounds have a structure in which a polar group is connected to a carbon atom forming the double bond via at least one carbon atom. Thus, when such a compound and a conjugated diene compound are copolymerized, the polymerization reaction is less likely to be inhibited by the polar group. Further, the polar group-containing copolymer obtainable by copolymerizing such a compound and a conjugated diene compound well interacts with filler such as silica, and allows the filler to be dispersed upon kneading. As a result, the abrasion resistance, performance on ice, and handling stability on dry roads are simultaneously achieved in a balanced manner.

In formula (I), $R^1$s each are hydrogen, a vinyl group, or a C1-C3 aliphatic hydrocarbon group, and may be the same as or different from each other; $R^2$s each are hydrogen or a C1-C3 aliphatic hydrocarbon group and may be the same as or different from each other; $R^3$ is hydrogen or a C1-C8 aliphatic or alicyclic hydrocarbon group; X is a hydroxy group, —$NR_2$, or a group represented by —$Si(OR)_k(R)_{3-k}$ as defined above; n is an integer of 1 to 10; and the $R^1$, $R^2$, $R^3$, the carbon atom linked to the $R^2$, and/or the carbon atom linked to the $R^3$ may be bonded to each other to form a ring structure.

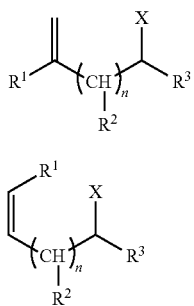

(I-1)

(I-2)

In formulas (I-1) and (I-2), $R^1$, $R^2$, $R^3$, X, and n are the same as defined above.

Also in formulas (I-1) and (I-2), a ring structure may be formed in the same manner as in formula (I).

In the polar group-containing vinyl compound of formula (I), $R^1$ is preferably hydrogen, a vinyl group, or a C1-C2 aliphatic hydrocarbon group and $R^2$ is preferably hydrogen or a C1-C2 aliphatic hydrocarbon group, for easy copolymerization. For good abrasion resistance, performance on ice, and handling stability, $R^3$ is preferably hydrogen or a C1-C4 aliphatic or alicyclic hydrocarbon group. Examples of the aliphatic hydrocarbon group for $R^1$ and $R^2$ include alkyl groups such as a methyl group, ethyl group, n-propyl group, and isopropyl group. Examples of the aliphatic hydrocarbon group for $R^3$ include, in addition to the above aliphatic hydrocarbon groups for $R^1$ and $R^2$, an n-butyl group, iso-butyl group, sec-butyl group, tert-butyl group, pentyl group, hexyl group, heptyl group, 2-ethylhexyl group, and octyl group. Examples of the alicyclic hydrocarbon group for $R^3$ include a cyclopropyl group, cyclobutyl group, cyclopentyl group, cyclohexyl group, cyclopentenyl group, and cyclohexenyl group. Further, $R^3$ may have a substituent.

For easy copolymerization, n is preferably 2 to 10, and more preferably 4 to 10. If n is greater than 10, the cost tends to be high. If n is an integer of 2 or greater, the compound of formula (I) has two or more units represented by —$(C(R^2)_2)$—; $R^2$s in the same unit or $R^2$s between different units may be the same as or different from each other.

Examples of the polar group-containing vinyl compound of formula (I) include 3-buten-1-ol, 3-methyl-3-buten-1-ol, 3-methylidene-hexan-1-ol, 5-hexen-1-ol, 2-methyl-5-hexen-1-ol, 4-methylidenehexan-2-ol, 4-penten-1-ol, 4-methyl-4-penten-1-ol, 4-methylidenehexan-1-ol, 5-methyl-5-hexen-1-ol, 5-methylideneheptan-1-ol, 5-hexen-4-methyl-1-ol, 4,5-dimethyl-5-hexen-1-ol, 4-methyl-5-methylideneheptan-1-ol, 3,4-dimethyl-5-hexen-1-ol, 3,4,5-trimethyl-5-hexen-1-ol, 3,4-dimethyl-5-methylideneheptan-1-ol, 2-ethyl-5-methyl-5-hexen-1-ol, 3-hydroxy-6-methyl-7-octene, 6-hepten-1-ol, 6-methyl-6-hepten-1-ol, 6-methylideneoctan-1-ol, 7-octen-1-ol, 7-methyl-7-octen-1-ol, 7-methylidenenonan-1-ol, 8-nonen-1-ol, 8-methyl-8-nonen-1-ol, 8-methylidenedecan-1-ol, 9-decen-1-ol, 9-methyl-9-decen-1-ol, 9-methylideneundecan-1-ol, 10-undecen-1-ol, 10-methyl-10-undecen-1-ol, 10-methylidenedodecan-1-ol, 7,9,10-trimethyl-10-undecen-1-ol, 2-cyclohexyl-5-hexen-1-ol, 3-cyclohexyl-6-hepten-2-ol, 4-hexen-1-ol, 5-hepten-1-ol, 6-octen-1-ol, 7-nonen-1-ol, 8-decen-1-ol, 4-methyl-5-hepten-2-ol, 5-methyl-6-octen-2-ol, 6-methyl-7-nonen-2-ol, 3-methyl-4-hexen-1-ol, 4-methyl-5-hepten-1-ol, 5-methyl-6-octen-1-ol, 6-methyl-7-nonen-1-ol, 7-methyl-8-decen-1-ol, 3-methyl-4-hepten-1-ol, 4-methyl-5-octen-1-ol, 5-methyl-6-nonen-1-ol, 4-hepten-1-ol, 5-octen-1-ol, 6-nonen-1-ol, 5,6-dimethyl-5-hepten-1-ol, (Z)-5-methyl-5-hepten-1-ol, and (E)-7-methyl-7-nonen-2-ol. Preferable among these are 3-methyl-3-buten-1-ol, 4-penten-1-ol, 5-hexen-1-ol, 6-hepten-1-ol, 9-decen-1-ol, 10-undecen-1-ol, 4-hexen-1-ol, 4-hepten-1-ol, and 5-octen-1-ol for easy availability, easy copolymerization, improved performance, and the like.

Examples thereof further include compounds obtained by replacing the hydroxy group in a hydroxy group-containing vinyl compound as listed above by —$NH_2$. Specific examples thereof include 1-amino-3-butene, 1-amino-3-methyl-3-butene, 1-amino-(3-methylidene)hexane, 2-amino-4-hexene, 2-amino-4-methyl-4-hexene, 2-amino-(4-methylidene)hexane, 1-amino-4-pentene, 1-amino-4-methyl-4-penten-1-ol, 1-amino-(4-methylidene)hexane, 1-amino-5-methyl-5-hexene, 1-amino-(5-methylidene)heptane, 1-amino-4-methyl-5-hexene, 1-amino-4,5-dimethyl-5-hexene, 1-amino-4-methyl-(5-methylidene)heptane, 1-amino-3,4-dimethyl-5-hexene, 1-amino-3,4,5-trimethyl-5-hexene, 1-amino-3,4-dimethyl-(5-methylidene)heptane, 1-amino-2-ethyl-5-methyl-5-hexene, 3-amino-6-methyl-7-octene, 1-amino-6-heptene, 1-amino-6-methyl-6-heptene, 1-amino-(6-methylidene)octane, 1-amino-7-octene, 1-amino-7-methyl-7-octene, 1-amino-(7-methylidene)nonane, 1-amino-8-nonene, 1-amino-8-methyl-8-nonene, 1-amino-(8-methylidene)decane, 1-amino-9-decene, 1-amino-9-methyl-9-decene, 1-amino-(9-methylidene)undecane, 1-amino-10-undecene, 1-amino-10-methyl-10-undecene, 1-amino-10-methylidenedodecane, 1-amino-7,9,10-trimethyl-10-undecene, 1-amino-2-cyclohexyl-5-hexene, 2-amino-3-cyclohexyl-6-heptene, 1-amino-4-hexene, 1-amino-5-heptene, 1-amino-6-octene, 1-amino-7-nonene, 1-amino-8-decene, 1-amino-4-methyl-5-heptene, 2-amino-5-methyl-6-octene, 2-amino-6-methyl-7-nonene, 1-amino-3-methyl-4-hexene, 1-amino-4-methyl-5-heptene, 1-amino-5-methyl-6-octene, 1-amino-6-methyl-7-nonene, 1-amino-7-methyl-8-decene, 1-amino-3-methyl-4-heptene, 1-amino-4-methyl-5-octene, 1-amino-5-methyl-6-nonene, 1-amino-4-heptene, 1-amino-5-octene, 1-amino-6-nonene, 2-(1-cyclohexenyl)ethylamine, and 2-(1-cyclohexenyl)propylamine. Preferable among these is 2-(1-cyclohexenyl)ethylamine for easy availability.

Examples thereof furthermore include compounds obtained by replacing the hydroxy group in a hydroxy group-containing vinyl compound as listed above by —$NHCH_3$ (e.g. 1-(N-methylamino)-3-butene and 1-(N-methylamino)-3-methyl-3-butene) and those obtained by replacing it by —$N(CH_3)_2$ (e.g. 1-(N,N-dimethylamino)-3-butene and 1-(N,N-dimethylamino)-3-methyl-3-butene).

Examples thereof furthermore include compounds obtained by replacing the hydroxy group in a hydroxy group-containing vinyl compound as listed above by the group represented by —$Si(OR)_k(R)_{3-k}$. Specific examples thereof include 1-triethoxysilyl-3-butene, 1-triethoxysilyl-3-methyl-3-butene, 1-triethoxysilyl-(3-methylidene)hexane, 2-triethoxysilyl-4-hexene, 2-triethoxysilyl-4-methyl-4-hexene, 2-triethoxysilyl-(4-methylidene)hexane, 1-triethoxysilyl-4-pentene, 1-triethoxysilyl-4-methyl-4-penten-1-ol, 1-triethoxysilyl-(4-methylidene)hexane, 1-triethoxysilyl-5-methyl-5-hexene, 1-triethoxysilyl-(5-methylidene)heptane, 1-triethoxysilyl-4-methyl-5-hexene, 1-triethoxysilyl-4,5-dimethyl-5-hexene, 1-triethoxysilyl-4-methyl-(5-methylidene)heptane, 1-triethoxysilyl-3,4-dimethyl-5-hexene, 1-triethoxysilyl-3,4,5-trimethyl-5-hexene, 1-triethoxysilyl-3,4-dimethyl-(5-methylidene)heptane, 1-triethoxysilyl-2-ethyl-5-methyl-5-hexene, 3-triethoxysilyl-6-methyl-7-octene, 1-triethoxysilyl-6-heptene, 1-triethoxysilyl-6-methyl-6-heptene, 1-triethoxysilyl-(6-methylidene)octane, 1-triethoxysilyl-7-octene, 1-triethoxysilyl-7-methyl-7- octene, 1-triethoxysilyl-(7-methylidene)nonane, 1-triethoxysilyl-8-nonene, 1-triethoxysilyl-8-methyl-8-nonene, 1-triethoxysilyl-(8-methylidene)decane, 1-triethoxysilyl-9-decene, 1-triethoxysilyl-9-methyl-9-decene, 1-triethoxysilyl-(9-methylidene)undecane, 1-triethoxysilyl-10-undecene, 1-triethoxysilyl-10-methyl-10-undecene, 1-triethoxysilyl-10-methylidenedodecane, 1-triethoxysilyl-7,9,10-trimethyl-10-undecene, 1-triethoxysilyl-2-cyclohexyl-5-hexene, 2-triethoxysilyl-3-cyclohexyl-6-heptene, 1-triethoxysilyl-4-hexene, 1-triethoxysilyl-5-heptene, 1-triethoxysilyl-6-octene, 1-triethoxysilyl-7-nonene, 1-triethoxysilyl-8-decene, 1-triethoxysilyl-4-methyl-5-heptene, 2-triethoxysilyl-5-methyl-6-octene, 2-triethoxysilyl-6-methyl-7-nonene, 1-triethoxysilyl-3-methyl-4-hexene, 1-triethoxysilyl-4-methyl-5-heptene, 1-triethoxysilyl-5-methyl-6-octene, 1-triethoxysilyl-6-methyl-7-nonene, 1-triethoxysilyl-7-methyl-8-decene, 1-triethoxysilyl-3-methyl-4-heptene, 1-triethoxysilyl-4-methyl-5-octene, 1-triethoxysilyl-5-methyl-6-nonene, 1-triethoxysilyl-4-heptene, 1-triethoxysilyl-5-octene, 1-triethoxysilyl-6-nonene, trimethoxy(7-octen-1-yl)silane, 1-trimethoxysilyl-5-hexene, 1-trimethoxysilyl-7-octene, 1-(diethoxymethylsilyl)-3-butene, 1-(diethoxymethylsilyl)-(3-methylidene)hexane, 1-(ethoxydimethylsilyl)-3-methyl-3-butene, 2-(ethoxydimethylsilyl)-4-hexene, 2-methoxydimethylsilyl-4-methyl-4-hexene, and 1-methoxydimethylsilyl-4-pentene. Specific examples thereof further include 5-(triethoxysilyl)-2-norbornene and 5-trimethoxysilyl-2-norbornene.

Each of the polar group-containing vinyl compounds may be used alone, or two or more of these may be used in combination.

Examples of the conjugated diene compound to be used in the present invention include 1,3-butadiene, isoprene, 1,3-pentadiene, 2,3-dimethylbutadiene, 2-phenyl-1,3-butadiene, and 1,3-hexadiene. Preferably used among these is 1,3-butadiene or isoprene from the viewpoint of practical use such as easy availability of monomers. Each of the conjugated diene compounds may be used alone, or two or more of these may be used in combination.

The polar group-containing copolymer of the present invention can be produced by copolymerizing the polar group-containing vinyl compound of formula (I) with the conjugated diene compound. The polymerization method is not particularly limited, and any of solution polymerization, gas phase polymerization, and bulk polymerization can be adopted. In particular, solution polymerization is preferable for flexibility in polymer design, processability, and the like.

In the case that the solution polymerization is adopted, the monomer concentration in a solvent is preferably 3% by mass or higher, and more preferably 5% by mass or higher. If the monomer concentration in a solution is lower than 3% by mass, the amount of a polymer to be obtained tends to be small and the cost tends to be high. Also, the monomer concentration in a solvent is preferably 20% by mass or lower, and more preferably 15% by mass or lower. If the monomer concentration in a solvent is higher than 20% by mass, the solution tends to be too viscous and less likely to be stirred, and polymerization is less likely to proceed. The polymerization system may be a batch type or a continuous type.

In the solution polymerization, the type of a catalyst is not particularly limited. A transition metal-containing compound such as a lanthanide- (e.g. Nd-), Ti-, Co-, or Ni-containing compound may be used as a catalyst. Further, an Al- or B-containing compound may be used as a promoter.

The lanthanide-containing compound (e.g. Nd-containing compound) is not particularly limited as long as it contains an element with an atomic number of 57 to 71. Examples thereof include carboxylates, β-diketone complexes, alkoxides, phosphates or phosphites, and halides. Preferable among these are carboxylates, alkoxides, and β-diketone complexes for easy handleability and improved tire performance. Examples of the Ti-containing compound include compounds having one cyclopentadienyl group, one indenyl group, one substituted cyclopentadienyl group, or one substituted indenyl group, and having three substituents selected from halogens, alkoxyl groups, and alkyl groups. Preferable among these are compounds having one alkoxysilyl group for improved catalyst performance and tire performance. Examples of the Co-containing compound include halides, carboxylates, β-diketone complexes, organic base complexes, and organic phosphine complexes. Examples of the Ni-containing compound include, but not limited to, halides, carboxylates, β-diketone complexes, and organic base complexes.

The Al-containing compound to be used as a promoter is not particularly limited as long as it may, for example, be an organoaluminoxane, halogenated organoaluminum compound, organoaluminum compound, or hydrogenated organoaluminum compound. Preferable are methylaluminoxane, ethylaluminoxane, propylaluminoxane, butylaluminoxane, isobutylaluminoxane, octylaluminoxane, hexylaluminoxane, chloroaluminoxane, trimethylaluminum, triethylaluminum, triisopropylaluminum, triisobutylaluminum, diethyl aluminum hydride, diisobutyl aluminum hydride, dimethyl aluminum chloride, diethyl aluminum chloride, methyl aluminum dichloride, and ethyl aluminum dichloride, and these may be used in admixture. Examples of the B-containing compound include anion-containing compounds such as tetraphenyl borate, tetrakis(pentafluorophenyl)borate and (3,5-bistrifluoromethylphenyl)borate.

If a protonic compound is used among the polar group-containing vinyl compounds in the preparation of the polar group-containing copolymer of the present invention, the copolymerization is preferably performed after the compound is preliminarily inactivated in order to prevent inhibition of the polymerization reaction. The inactivating method is not particularly limited; for example, the polar group-containing vinyl compound of formula (I) is preliminarily reacted with a compound represented by formula (II):

$$M(R^4)_m \qquad (II)$$

(in formula (II), M is aluminum, boron, silicon, or titanium; $R^4$s each are a C1-C8 aliphatic or alicyclic hydrocarbon group, a C1-C8 aliphatic or alicyclic alkoxy group, or a halogen, and may be the same as or different from each other; and m is an integer of 3 or 4), and then the resulting polar group-containing vinyl compound of formula (I) and the conjugated diene compound are copolymerized with each other. Thereby, the polar group such as a hydroxy group in the polar group-containing vinyl compound (which is one of the inhibiting factors of the polymerization reaction) is inactivated, and therefore a target polar group-containing copolymer can be favorably produced by copolymerizing the reaction product obtained by the reaction and the conjugated diene compound. If the inactivation is not performed, in other words, the polar group-containing vinyl compound is not reacted with the compound of formula (II), the polymerization reaction proceeds very slowly, or the polymerization reaction does not proceed, in many cases.

$R^4$ preferably has 1 to 6 carbon atoms. Examples of the aliphatic or alicyclic hydrocarbon group for $R^4$ include the same groups as for $R^3$, and examples of the aliphatic or alicyclic alkoxy group include alkoxy groups corresponding to the aliphatic or alicyclic hydrocarbon groups. Further, the halogen for $R^4$ may be chlorine, bromine, fluorine, or the like.

The compound of formula (II) to be suitably used may be an organometal compound represented by formula (III) or (IV):

in formula (III), $R^5$s each are a C1-C8 aliphatic or alicyclic hydrocarbon group, and may be the same as or different from each other; and in formula (IV), $R^6$s each are a C1-C8 aliphatic or alicyclic hydrocarbon group or a C1-C8 aliphatic or alicyclic alkoxy group, and may be the same as or different from each other; and $M^1$ is silicon or titanium.

Examples of the C1-C8 aliphatic or alicyclic hydrocarbon group for $R^5$ and $R^6$ include the same groups as for $R^4$. Examples of the C1-C8 aliphatic or alicyclic alkoxy group for $R^6$ include alkoxy groups corresponding to the aliphatic or alicyclic hydrocarbon groups.

The compound of formula (III) is not particularly limited. Examples thereof include trimethylaluminum, triethylaluminum, triisopropylaluminum, triisobutylaluminum, dimethyl aluminum chloride, diisopropyl aluminum chloride, diisobutyl aluminum chloride, and ethyl aluminum dichloride. The compound of formula (IV) is not particularly limited. Examples thereof include tetramethoxysilane, tetraethoxysilane, tetraisopropoxysilane, tetra-n-propoxysilane, tetraisobutoxysilane, tetra-n-butoxysilane, diethoxydimethylsilane, ethoxytrimethylsilane, diethoxydiethylsilane, ethoxytriethylsilane, tetramethoxytitanium, tetraethoxytitanium, tetraisopropoxytitanium, tetra-n-propoxytitanium, tetraisobutoxytitanium, tetra-n-butoxytitanium, tetra-t-butoxytitanium, and tetra-sec-butoxytitanium.

The reaction of the polar group-containing vinyl compound and the compound of formula (II) may be performed in any vessel. The reaction is preferably performed at least in an inert gas such as nitrogen gas or argon.

The method for producing the polar group-containing copolymer using the catalyst as a polymerization initiator is not particularly limited, and a conventionally known method can be adopted.

Specifically, the target polymer can be obtained by copolymerizing the reaction product of the compounds represented by formula (I) and formula (II) with the conjugated diene compound in an organic solvent inert to the reaction, such as a hydrocarbon solvent of, for example, aliphatic, alicyclic, or aromatic hydrocarbon compounds using the lanthanide-, Ti-, Co-, or Ni-containing compound as a catalyst and the Al- or B-containing compound as a promoter.

The hydrocarbon solvent preferably has 3 to 8 carbon atoms. Examples thereof include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene, dichloromethane, chloroform, and chlorobenzene. Each of these may be used alone, or two or more of these may be used in combination.

Preferably, the polar group-containing copolymer of the present invention is a copolymer which includes 0.1 to 20% by mass of a structural unit A having 50% by mass or less of a unit derived from the conjugated diene compound and 50% by mass or more of a unit derived from the polar group-containing vinyl compound, and 80 to 99.9% by mass of a structural unit B having 60% by mass or more of a unit derived from the conjugated diene compound and 40% by mass or less of a unit derived from the polar group-containing vinyl compound, and the polar group-containing copolymer has the structural unit A at its end. In other words, the structural unit A having 50% by mass or more of a unit derived from the polar group-containing vinyl compound exists at least at an end of the polar group-containing copolymer and the structural unit B having as small as 40% by mass or less of the unit also exists in the polar group-containing copolymer. Thereby, the dispersibility of silica increases, reduction in elastic modulus at high strain is suppressed, and the handling stability on dry roads is improved. Therefore, the abrasion resistance, performance on ice, and handling stability achieve better balance. Examples of such a polar group-containing copolymer include those in which a polymer portion I having 60% by mass or more of a unit derived from the conjugated diene compound and 40% by mass or less of a unit derived from the polar group-containing vinyl compound in a random structure is terminally linked to a polymer portion II having 50% by mass or less (preferably 5% by mass or less, more preferably 2% by mass or less, and further preferably 0% by mass) of a unit derived from the conjugated diene compound and 50% by mass or more (preferably 95% by mass or more, more preferably 98% by mass or more, and further preferably 100% by mass) of a unit derived from the polar group-containing vinyl compound. Here, if the polymer portion II has 100% by mass of a unit derived from the polar group-containing vinyl compound, the polar group-containing copolymer has a block structure of the polar group-containing vinyl compound at an end of the random-structured polymer portion I.

The polar group-containing copolymer having the structural units A and B can be obtained by, for example, copolymerizing the conjugated diene compound and the polar group-containing vinyl compound using the transition metal-containing compound as a catalyst to provide a copolymer having an active end, and further reacting the polar group-containing vinyl compound with the active end. Specifically, copolymerization of the reaction product of the compounds represented by formula (I) and formula (II) and the conjugated diene compound in the inert organic solvent in the presence of the catalyst and promoter can provide a solution of a copolymer having an active end, and then further reaction of the obtained copolymer solution and the reaction product of the compounds represented by formula (I) and formula (II) can provide the target polar group-containing copolymer.

In the present invention, if necessary, modification may be introduced using a known end modifier after the copolymerization reaction for the purpose of even slightly increasing the affinity for silica. The modification means that an active end portion of the polar group-containing copolymer reacts with the modifier so as to be end-modified. The modified end has increased affinity for a functional group such as a hydroxy group on silica, so that the dispersibility of silica tends to increase and the handling stability tends to be improved.

The modifier is not particularly limited. Examples thereof include, if selected from among silicon compounds, 3-(N,N-dimethylamino)propyltrimethoxysilane, 3-(N,N-diethylamino)propyltrimethoxysilane, 3-(N,N-dimethylamino)propyltriethoxysilane, 3-(N,N-diethylamino)

propyltriethoxysilane, 3-glycidoxypropyltrimethoxysilane, 2-(4-pyridylethyl)triethoxysilane, and N-(3-triethoxysilylpropyl)-4,5-dihydroimidazole.

In the present invention, a known antioxidant and an alcohol or the like for the purpose of terminating the polymerization reaction may be added after the reaction, if necessary. Addition of an alcohol after the polymerization reaction causes separation of the compound of formula (II) which has been linked to the polar group such as a hydroxy group of the polar group-containing vinyl compound and therefore formation of the polar group. Thereby, the affinity for silica further increases.

The content of the polar group-containing vinyl compound in the polar group-containing copolymer is preferably 0.03% by mass or more, more preferably 0.05% by mass or more, and further preferably 0.1% by mass or more. Also, the content is preferably 40% by mass or less, more preferably 30% by mass or less, further preferably 20% by mass or less, and particularly preferably 10% by mass or less. If the content is less than 0.03% by mass, the performance on ice and handling stability on dry roads are less likely to be improved; while if the content is more than 40% by mass, the reaction time tends to be longer and the cost tends to be high.

In the present invention, the content of the polar group-containing vinyl compound is measured by the method mentioned in the following examples.

For good abrasion resistance and performance on ice, the conjugated diene compound to be used is preferably 1,3-butadiene. The content of 1,3-butadiene based on 100% by mass of the conjugated diene compound content in the polar group-containing copolymer is preferably 80% by mass or more, more preferably 85% by mass or more, and further preferably 90% by mass or more.

In the polar group-containing copolymer of the present invention, the cis content of the double bond portion of the conjugated diene compound in the polar group-containing copolymer (the cis content of double bonds in conjugated diene compound units in the polar group-containing copolymer) is 80 mol % or more, and preferably 90 mol % or more. If the cis content is less than 80 mol %, the flexibility and abrasion resistance tend to be poor.

In the present invention, the content of the cis component (cis content) is a value obtained by the method mentioned in the following examples.

The weight average molecular weight Mw of the polar group-containing copolymer is preferably $1.0 \times 10^3$ to $2.0 \times 10^6$. The lower limit thereof is more preferably $1.0 \times 10^4$, and further preferably $2.0 \times 10^4$. The upper limit thereof is more preferably $1.0 \times 10^6$. If the weight average molecular weight is less than $1.0 \times 10^3$, the hysteresis loss is likely to be high and sufficient fuel economy is less likely to be achieved; further, the abrasion resistance tends to be lower. Also, if the Mw is more than $2.0 \times 10^6$, the processability tends to be greatly lowered.

The Mw/Mn of the polar group-containing copolymer is preferably 4.5 or lower, and more preferably 4.0 or lower. If the Mw/Mn is higher than 4.5, the content of low molecular weight components increases, so that the abrasion resistance tends to be poor.

In the present invention, the weight average molecular weight (Mw) and the number average molecular weight (Mn) are measured by the method mentioned in the following examples.

<Rubber Composition>

The rubber composition of the present invention contains a diene rubber ingredient, the polar group-containing copolymer, and silica. In the case that a copolymer of the conjugated diene compound, such as butadiene, and the polar group-containing vinyl compound is prepared by the above method, and the resulting high-cis-content diene rubber having a polar group at its main chain is used in a rubber composition, the abrasion resistance and the dispersibility of silica are more improved than in conventional rubber compositions. As a result, the abrasion resistance, performance on ice, and handling stability on dry roads can be simultaneously achieved in a balanced manner. Thus, a winter tire excellent in these properties can be suitably obtained.

The diene rubber ingredient to be used in the present invention is not particularly limited. Examples thereof include natural rubber (NR), styrene-butadiene rubber (SBR), butadiene rubber (BR), isoprene rubber (IR), ethylene-propylene-diene rubber (EPDM), chloroprene rubber (CR), acrylonitrile-butadiene rubber (NBR), butyl rubber (IIR), halogenated butyl rubber (X-IIR), and epoxidized diene rubber (e.g. epoxidized natural rubber (ENR), epoxidized butadiene rubber (EBR), epoxidized isoprene rubber (EIR), epoxidized styrene-butadiene rubber (ESBR), epoxidized styrene-butadiene-styrene copolymer, and partially hydrogenated products thereof). Preferable among these are NR, BR, and SBR in order to achieve the performance on ice, handling stability on dry roads, and abrasion resistance in a balanced manner, and more preferable are NR and BR. Each of these rubbers may be used alone, or two or more of these may be used in combination.

In the case that the rubber composition of the present invention contains NR, the amount of NR is preferably 10% by mass or more, more preferably 15% by mass or more, and further preferably 20% by mass or more, while preferably 90% by mass or less, more preferably 80% by mass or less, and further preferably 70% by mass or less, in 100% by mass of the total of rubber ingredients (the total amount of rubber ingredients including the diene rubber ingredient and the polar group-containing copolymer). If the amount is within the range, the abrasion resistance, performance on ice, and handling stability on dry roads are achieved in a balanced manner.

In the case that the rubber composition of the present invention contains BR, the amount of BR is preferably 1% by mass or more, more preferably 2% by mass or more, and further preferably 3% by mass or more, while preferably 90% by mass or less, more preferably 85% by mass or less, and further preferably 80% by mass or less, in 100% by mass of the total of rubber ingredients. If the amount is within the above range, the abrasion resistance, performance on ice, and handling stability on dry roads are achieved in a balanced manner.

In the rubber composition, the amount of the polar group-containing copolymer is preferably 5% by mass or more, more preferably 10% by mass or more, further preferably 15% by mass or more, and particularly preferably 20% by mass or more, in 100% by mass of the total of rubber ingredients. If the amount is less than 5% by mass, the performance on ice and handling stability on dry roads tend to be less improved. The upper limit thereof is not particularly limited; it is preferably 90% by mass or less, more preferably 80% by mass or less, further preferably 70% by mass or less, and particularly preferably 60% by mass or less. If the amount is more than 90% by mass, the tensile strength at break tends to be poor.

The silica to be used in the present invention has a nitrogen adsorption specific surface area ($N_2SA$) of preferably 50 m$^2$/g or larger, and more preferably 80 m$^2$/g or larger. Also, the $N_2SA$ is preferably 300 m$^2$/g or smaller, and more preferably 250 m$^2$/g or smaller. A silica having a nitrogen adsorption specific surface area of smaller than 50 m²/g may show an insufficient reinforcing effect, and the abrasion resistance tends to be poor. A silica having an $N_2SA$ of larger than 300 m²/g may be poor in dispersibility, the hysteresis loss tends to be high, and the fuel efficiency tends to be poor.

The nitrogen adsorption specific surface area of silica is a value measured by the BET method in accordance with ASTM D3037-81.

The amount of silica is preferably 5 to 150 parts by mass relative to 100 parts by mass of the total of rubber ingredients; the lower limit thereof is more preferably 10 parts by mass, and the upper limit thereof is more preferably 100 parts by mass. If the amount of silica is less than 5 parts by mass, the abrasion resistance tends to be insufficient. Also, if the amount of silica is more than 150 parts by mass, the processability tends to be poor. Each of silicas may be used alone, or two or more of these may be used in combination.

In the present invention, a silane coupling agent may be used with silica. Examples of the silane coupling agent include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazole tetrasulfide, 3-triethoxysilylpropylbenzothiazolyl tetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyl tetrasulfide, and dimethoxymethylsilylpropylbenzothiazole tetrasulfide. Particularly preferable among these are bis(3-triethoxysilylpropyl)tetrasulfide and 3-trimethoxysilylpropylbenzothiazolyl tetrasulfide for improved reinforcement and the like. Each of these silane coupling agents may be used alone, or two or more of these may be used in combination.

The amount of silane coupling agent is preferably 1 part by mass or more, and more preferably 2 parts by mass or more, relative to 100 parts by mass of the silica. If the amount is less than 1 part by mass, an unvulcanized rubber composition tends to have high viscosity and the processability tends to be poor. Also, the amount is preferably 20 parts by mass or less, and more preferably 15 parts by mass or less. If the amount is more than 20 parts by mass, the effect of the silane coupling agent to be achieved may not correspond to its amount, and the cost tends to be high.

In the present invention, carbon black is preferably used as a reinforcing agent. The carbon black preferably has a nitrogen adsorption specific surface area ($N_2SA$) of 80 to 280 m²/g; the lower limit is more preferably 100 m²/g, and the upper limit is more preferably 250 m²/g. A carbon black having an $N_2SA$ of smaller than 80 m²/g tends not to provide sufficient wet grip performance, and the abrasion resistance tends to be poor. Also, a carbon black having an $N_2SA$ of larger than 280 m²/g tends to be poor in dispersibility, and the abrasion resistance tends to be poor.

The nitrogen adsorption specific surface area of carbon black can be determined by the method A in accordance with JIS K6217.

The amount of carbon black is preferably 5 to 150 parts by mass relative to 100 parts by mass of the total of rubber ingredients; the lower limit is more preferably 10 parts by mass, and the upper limit is more preferably 100 parts by mass. If the amount of carbon black is less than 5 parts by mass, the abrasion resistance tends to be poor. Also, if the amount is more than 150 parts by mass, the processability tends to be poor. One kind of carbon black may be used alone, or two or more kinds thereof may be used in combination.

The rubber composition of the present invention may further contain other compounding ingredients and additives for tires or general rubber compositions, such as a reinforcing agent, vulcanizing agent, vulcanization accelerator, oil, antioxidant, softener, and plasticizer. In addition, the amounts of these compounding ingredients and additives can be set to usual amounts.

The method for producing the rubber composition of the present invention may be a known method. For example; the composition may be produced by a method in which the respective ingredients are kneaded using a rubber kneader such as an open roll mill or Bunbury mixer, and then vulcanized (cross-linked).

<Winter Tire>

The winter tire (studless tire) of the present invention can be produced using the rubber composition by a usual method. That is, the respective chemicals are blended as appropriate to form a rubber composition, and the rubber composition in an unvulcanized state is extrusion-processed into the shape of a tire component (e.g. tread), and molded on a tire building machine by a usual method to form an unvulcanized tire. This unvulcanized tire is heat-pressurized in a vulcanizer to provide a tire. The winter tire of the present invention thus obtained can achieve the abrasion resistance, performance on ice, and handling stability on dry roads together.

EXAMPLES

The present invention will be described in detail hereinbelow referring to, but not limited to, examples.

The following will describe the chemicals used in Syntheses of Monomer Solutions (1) to (3), Synthesis of Monomer (4), Syntheses of Polymers (1) to (8), Syntheses of Monomer Solutions (a) and (b), Synthesis of Monomer (c), Syntheses of Polymers (a) to (g), Synthesis of Catalyst Solution, Synthesis of Amine Monomer Solution, Syntheses of Polymers (A) to (D), and Synthesis of Catalyst Solution (A). The chemicals were purified by a usual method if necessary.

Cyclohexane: anhydrous cyclohexane (KANTO CHEMICAL CO., INC.)

Toluene: anhydrous toluene (KANTO CHEMICAL CO., INC.)

Isopropanol: isopropanol (KANTO CHEMICAL CO., INC.)

5-Hexen-1-ol: 5-hexen-1-ol (Tokyo Chemical Industry Co., Ltd.)

10-Undecen-1-ol: 10-undecen-1-ol (Tokyo Chemical Industry Co., Ltd.)

5-Octen-1-ol: cis-5-octen-1-ol (Tokyo Chemical Industry Co., Ltd.)

9-Decen-1-ol: 9-decen-1-ol (KANTO CHEMICAL CO., INC.)

Amine monomer: 2-(1-cyclohexenyl)ethylamine (Tokyo Chemical Industry Co., Ltd.)

Silane Monomer (A): trimethoxy(7-octen-1-yl)silane (80% by mass) (Sigma-Aldrich Japan K.K.)

Silane Monomer (B): 5-(triethoxysilyl)-2-norbornene (97% by mass) (Tokyo Chemical Industry Co., Ltd.)

Tetraethoxysilane: tetraethoxysilane (KANTO CHEMICAL CO., INC.)

Tetraisopropyl orthosilicate: tetraisopropyl orthosilicate (Tokyo Chemical Industry Co., Ltd.)

Neodymium ethylhexanoate: neodymium ethylhexanoate (neodymium ethylhexanoate/toluene solution: 0.2 mol/L) (Wako Pure Chemical Industries, Ltd.)

Cyclopentadienyl titanium trichloride: cyclopentadienyl titanium trichloride (KANTO CHEMICAL CO., INC.)

TIBA solution: triisobutyl aluminum/hexane solution (1M) (Tosoh Finechem Corporation)

DEAC solution: diethyl aluminum chloride/hexane solution (1M) (Tosoh Finechem Corporation)

DIBAH solution: isodibutyl aluminum hydride/toluene solution (1 M) (Tosoh Finechem Corporation)

Butadiene: 1,3-butadiene (Takachiho Chemical Industrial Co., Ltd.)

PMAO (polymethylaluminosiloxane): PMAO (Al: 6.8% by mass) (Tosoh Finechem Corporation)

3-Glycidoxypropylmethyldiethoxysilane: 3-glycidoxypropylmethyldiethoxysilane (Shin-Etsu Chemical Co., Ltd.)

n-Butyllithium in hexane: 1.6 M n-butyllithium in hexane (KANTO CHEMICAL CO., INC.)

Tetrahydrofuran (THF): tetrahydrofuran (KANTO CHEMICAL CO., INC.)

Methanol: methanol (KANTO CHEMICAL CO., INC.)

3-(N,N-dimethylamino)propyltrimethoxysilane: 3-(N,N-dimethylaminopropyl)trimethoxysilane (AZmax.co)

0.01 M BHT in isopropanol: prepared using 2,6-tert-butyl-p-cresol (BHT) (KANTO CHEMICAL CO., INC.) and isopropanol (KANTO CHEMICAL CO., INC.)

The monomers and polymers obtained were analyzed by the following methods.

(Measurement of Monomer Purity)

The monomer purity was calculated based on the area ratio using a gas chromatograph GC 2010 (Shimadzu Corporation).

(Measurement of Weight Average Molecular Weight Mw and Number Average Molecular Weight Mn)

The Mw and Mn were measured using a GPC-8000 series device (TOSOH CORPORATION) and a differential refractometer as a detector, and the molecular weights were calibrated relative to polystyrene standards.

(Measurement of Content of Hydroxy Group-Containing Vinyl Compound in Polymer and Cis Content of Butadiene Units)

The content of the hydroxy group-containing vinyl compound and the cis content of double bonds in butadiene units in the polymer were measured using a JNM-ECA series NMR device (JEOL Ltd.). The measurement was performed on a sample prepared as follows: a synthesized polymer and intermediate (1 g each) were dissolved into toluene (15 ml each); and the respective solutions were slowly poured into methanol (30 ml each) for purification, and then dried for purification. The calculation was performed based on the signal intensity ratio between the 1,4-bond (5.30 to 5.50 ppm) and 1,2-bond (4.94 to 5.03 ppm) by $^1$H-NMR measurement and the signal intensity ratio between the cis bond (25.5 ppm) and trans bond (32.8 ppm) by $^{13}$C-NMR measurement.

(Measurement of Amino Group Content in Polymer)

The amount of the amine monomer introduced was measured using the NMR device, and was calculated from the ratio of the signal intensity at 2.73 to 2.80 ppm (2H) based on the amine monomer and the aforementioned signal intensity ratio based on the butadiene units.

(Measurement of Trialkoxy Group Content in Polymer)

The content of a trialkoxy group was estimated based on the amount of the silane monomer added and the area ratio of the silane monomer before and after the reaction using a gas chromatograph GC 2010 (Shimadzu Corporation).

Production Example 1

Synthesis of Monomer Solution (1)

A 200-cc glass vessel was purged with nitrogen. Cyclohexane (50 ml) and 10-undecen-1-ol (150 mmol) were put into the vessel and stirred. Further, a TIBA solution (170 ml) was dropwise added thereto at room temperature. After the dropwise addition was finished, the mixture was stirred for 30 minutes at room temperature. The obtained solution was stored in a refrigerator while the nitrogen atmosphere was maintained under the light-shielding condition.

Production Example 2

Synthesis of Monomer Solution (2)

A 200-cc glass vessel was purged with nitrogen. Cyclohexane (50 ml) and 5-hexen-1-ol (150 mmol) were put into the vessel and stirred. Further, a TIBA solution (170 ml) was dropwise added thereto at room temperature. After the dropwise addition was finished, the mixture was stirred for 30 minutes at room temperature. The obtained solution was stored in a refrigerator while the nitrogen atmosphere was maintained under the light-shielding condition.

Production Example 3

Synthesis of Monomer Solution (3)

A 300-cc glass vessel was purged with nitrogen. Cyclohexane (50 ml) and 5-octen-1-ol (150 mmol) were put into the vessel and stirred. Further, a TIBA solution (170 ml) was dropwise added thereto at room temperature. After the dropwise addition was finished, the mixture was stirred for 30 minutes at room temperature. The obtained solution was stored in a refrigerator while the nitrogen atmosphere was maintained under the light-shielding condition.

Production Example 4

Synthesis of Monomer (4)

A 500-cc two-neck glass flask was purged with nitrogen. Tetraethoxysilane (700 mmol) was put into the flask, stirred, and heated up to 70° C. Thereafter, 5-hexen-1-ol (350 mmol) was dropwise added thereto over 30 minutes. Further, the mixture was stirred for 2 hours while ethanol generated in the reaction was distilled off. The solution was distilled under reduced pressure so that unreacted tetraethoxysilane was distilled off. Thereby, Monomer (4) (about 70 g) was obtained. The gas chromatography test showed that the monomer purity was about 97%.

Production Example 5

Synthesis of Polymer (1)

A 50-ml glass vessel was purged with nitrogen. Butadiene in cyclohexane (4 ml, 4.6 mol/L) and a neodymium ethylhexanoate/toluene solution (1.2 ml, 0.2 mol/L) were put into the vessel and stirred. Then, PMAO (10 ml, Al: 6.8% by mass) was added thereto; after 5 minutes, a DIBAH solution (6 ml) was added; and after another 5 minutes, a DEAC solution (2 ml) was added. Thereafter, a 3-L pressure-resistant stainless-steel vessel was purged with nitrogen. Cyclohexane (1800 ml), butadiene (75 g), and a TIBA solution (1 ml) were put into the vessel and stirred for 10 minutes. The preliminarily prepared reaction solution (2.5 ml) in the 50-ml glass vessel was added thereto, and the mixture was stirred while the temperature was kept at 40° C. After 3 hours, 0.01 M BHT in isopropanol (10 ml) was dropwise added to terminate the reaction.

The reaction solution was cooled down and then added to methanol (3 L) separately prepared. The obtained precipitate was air-dried for 1 night, and further dried under reduced pressure for 2 days. Thereby, Polymer (1) was obtained. The yield was 97%. The GPC measurement showed that the obtained polymer had a weight average molecular weight of $22 \times 10^4$ and an Mw/Mn=2.5. The $^{13}$C-NMR measurement showed that the cis content of butadiene units was 99 mol %.

Production Example 6

Synthesis of Polymer (2)

A 50-ml glass vessel was purged with nitrogen. Butadiene in cyclohexane (4 ml, 4.6 mol/L) and a neodymium ethylhexanoate/toluene solution (1.2 ml, 0.2 mol/L) were put into the vessel and stirred. Then, PMAO (10 ml, Al: 6.8% by mass) was added; after 5 minutes, a DIBAH solution (6 ml) was added; and after another 5 minutes, a DEAC solution (2 ml) was added. Thereafter, a 3-L pressure-resistant stainless-steel vessel was purged with nitrogen. Cyclohexane (1800 ml), butadiene (75 g), Monomer Solution (1) (150 mmol), and a TIBA solution (1 ml) were put into the vessel and stirred for 10 minutes. The preliminarily prepared reaction solution (2.5 ml) in the 50-ml glass vessel was added thereto and the mixture was stirred while the temperature was kept at 40° C. After 3 hours, 0.01 M BHT in isopropanol (10 ml) was dropwise added to terminate the reaction.

The reaction solution was cooled down and then added to methanol (3 L) separately prepared. The obtained precipitate was air-dried for 1 night, and further dried under reduced pressure for 2 days. Thereby, Polymer (2) was obtained. The yield was 95%. The GPC measurement showed that the obtained polymer had a weight average molecular weight of $19 \times 10^4$ and an Mw/Mn=2.7. Further, part of the obtained polymer was dissolved in toluene so that the concentration was about 10% by mass. The solution was slowly poured into methanol in an amount of 5 times as much as the toluene, and the precipitate was dried to be purified. The purified polymer was subjected to the $^1$H-NMR measurement, and the measurement showed that the content of Monomer (1) was 0.5% by mass. Further, the $^{13}$C-NMR measurement showed that the cis content of butadiene units was about 99 mol %.

Production Example 7

Synthesis of Polymer (3)

Polymerization, purification, and analysis were performed in the same manner as in Production Example 6 except that before 0.01 M BHT in isopropanol (10 ml) was dropwise added, 3-glycidoxypropylmethyldiethoxysilane was added and the mixture was stirred for 30 minutes. The yield of Polymer (3) was about 94%. The GPC measurement showed that the obtained polymer had a weight average molecular weight of $33 \times 10^4$ and an Mw/Mn=3.3. The content of Monomer (1) was 0.5% by mass, and the cis content of butadiene units was about 98 mol %.

Production Example 8

Synthesis of Polymer (4)

Polymerization, purification, and analysis were performed by the same operation as in Production Example 6 except that Monomer Solution (1) was replaced with Monomer Solution (2). The yield of Polymer (4) was about 96%. The GPC measurement showed that the obtained polymer had a weight average molecular weight of $32 \times 10^4$ and an Mw/Mn=3.2. The content of Monomer (2) was 0.3% by mass, and the cis content of butadiene units was about 98 mol %.

Production Example 9

Synthesis of Polymer (5)

Polymerization, purification, and analysis were performed by the same operation as in Production Example 6 except that Monomer Solution (1) was replaced with Monomer Solution (3). The yield of Polymer (5) was about 95%. The content of Monomer (3) was 0.4% by mass, and the cis content of butadiene units was about 98 mol %. The GPC measurement showed that the obtained polymer had a weight average molecular weight of $18 \times 10^4$ and an Mw/Mn=3.4.

Production Example 10

Synthesis of Polymer (6)

A 50-ml glass vessel was purged with nitrogen. Butadiene in cyclohexane (4 ml, 4.6 mol/L) and a neodymium ethylhexanoate/toluene solution (1.2 ml, 0.2 mol/L) were put into the vessel and stirred. Then, PMAO (10 ml, Al: 6.8% by mass) was added; after 5 minutes, a DIBAH solution (6 ml) was added; and after another 5 minutes, a DEAC solution (2 ml) was added. Thereafter, a 3-L pressure-resistant stainless-steel vessel was purged with nitrogen. Cyclohexane (1800 ml), butadiene (75 g), Monomer (4) (150 mol), and a TIBA solution (1 ml) were put into the vessel and stirred for 10 minutes. The preliminarily prepared reaction solution (2.5 ml) in the 50-ml glass vessel was added thereto, and the mixture was stirred while the temperature was kept at 40° C. After 3 hours, 0.01-M BHT in ethanol (10 ml) was dropwise added to terminate the reaction. The reaction solution was cooled down and then added to methanol (3 L) separately prepared. The obtained precipitate was air-dried for 1 night, and further dried under reduced pressure for 2 days. Thereby, Polymer (6) was obtained. The yield was 93%. The GPC measurement showed that the obtained polymer had a weight average molecular weight of $34 \times 10^4$ and an Mw/Mn=3.5. Further, part of the obtained polymer was dissolved into toluene so that the concentration was about 10% by mass, and the solution was slowly poured into methanol in an amount of 5 times as much as the toluene. The precipitate was dried to be purified. The purified polymer was subjected to the $^1$H-NMR measurement, and the measurement showed that the content of Monomer (4) was 0.7% by mass. The $^{13}$C-NMR measurement showed that the cis content of butadiene units was about 97 mol %.

Production Example 11

Synthesis of Polymer (7)

A 50-ml glass vessel was purged with nitrogen. Butadiene in cyclohexane (10 ml, 4.6 mol/L) and PMAO (6.5 ml, Al:

6.8% by mass) were put into the vessel and stirred. After 5 minutes, a cyclopentadienyl titanium trichloride/toluene solution (1 ml, 10 mmol/L) was added and the mixture was stirred for 3 hours at 40° C. Thereafter, a 3-L pressure-resistant stainless-steel vessel was purged with nitrogen. Cyclohexane (1800 ml), butadiene (75 g), Monomer Solution (1) (150 mmol), and a TIBA solution (1 ml) were put into the vessel and stirred. After 10 minutes, the preliminarily prepared reaction solution (1.7 ml) in the 50-ml glass vessel was added thereto, and the reaction was performed for 24 hours while the temperature was kept at 40° C.

The reaction solution was cooled down and then added to methanol (3 L) separately prepared. The obtained precipitate was air-dried for 1 night, and further dried under reduced pressure for 2 days. Thereby, Polymer (7) was obtained. The yield was 63%. The GPC measurement showed that the obtained polymer had a weight average molecular weight of $38 \times 10^4$ and an Mw/Mn=3.6. Further, part of the obtained polymer was dissolved into toluene so that the concentration was about 5% by mass, and the solution was slowly poured into methanol in an amount of 5 times as much as the toluene. The precipitate was dried to be purified. The purified polymer was subjected to the $^1$H-NMR measurement, and the measurement showed that the content of Monomer (1) was 0.2% by mass. The $^{13}$C-NMR measurement showed that the cis content of butadiene units was about 86 mol %.

Production Example 12

Synthesis of Polymer (8)

A 1000-ml pressure-resistant vessel was sufficiently purged with nitrogen, and cyclohexane (650 ml), butadiene (1 mol), and THF (1 mmol) were put into the vessel. In addition, an n-butyllithium/hexane solution (0.64 mmol) was added thereto at 40° C., and the mixture was stirred for 3 hours. Further, 3-(N,N-dimethylamino)propyltrimethoxysilane (1 mmol) was added thereto, and the mixture was stirred for 30 minutes. Then, isopropanol (3 ml) was added to terminate the polymerization. The reaction solution was mixed with 2,6-tert-butyl-p-cresol (1 g), and then re-precipitated with methanol and heat-dried. Thereby, Polymer (8) was obtained. The yield was 98%. The GPC measurement showed that the obtained polymer had a weight average molecular weight of $38 \times 10^4$ and an Mw/Mn=1.1. The $^{13}$C-NMR measurement showed that the cis content of butadiene units was about 32 mol %.

Production Example 13

Synthesis of Monomer Solution (a)

A 200-cc glass vessel was purged with nitrogen. Cyclohexane (50 ml) and 5-octen-1-ol (150 mmol) were put into the vessel and stirred. Further, a TIBA solution (170 ml) was dropwise added thereto at room temperature. After the dropwise addition was finished, the mixture was stirred for 30 minutes at room temperature. The obtained solution was stored in a refrigerator while the nitrogen atmosphere was maintained under the light-shielding condition.

Production Example 14

Synthesis of Monomer Solution (b)

A 200-cc glass vessel was purged with nitrogen. Cyclohexane (50 ml) and 9-decen-1-ol (150 mmol) were put into the vessel and stirred. Further, a TIBA solution (170 ml) was dropwise added thereto. After the dropwise addition was finished, the mixture was stirred for 30 minutes at room temperature. The obtained solution was stored in a refrigerator while the nitrogen atmosphere was maintained under the light-shielding condition.

Production Example 15

Synthesis of Monomer (c)

A 500-cc two-neck glass flask was purged with nitrogen. Tetraisopropyl orthosilicate (700 mmol) was put into the vessel and stirred. 9-Decen-1-ol (350 mmol) was dropwise added thereto over 30 minutes on a 70° C. oil bath. Further, the temperature of the oil bath was raised up to 85° C., and the mixture was stirred for 2 hours while isopropanol generated in the reaction was distilled off. Unreacted tetraisopropyl orthosilicate was distilled under reduced pressure, and thereby Monomer (c) (about 120 g) was obtained. The gas chromatography test showed that the monomer purity was about 96%.

Production Example 16

Synthesis of Catalyst Solution

A 50-ml glass vessel was purged with nitrogen. Butadiene in cyclohexane (4 ml, 3.5 mol/L), a neodymium ethylhexanoate/toluene solution (1 ml, 0.2 mol/L), and PMAO (8 ml, Al: 6.8% by mass) were put into the vessel and stirred. After 5 minutes, an isodibutyl aluminum hydride/hexane solution (5 ml, 1 M) was added; and after another 5 minutes, a DEAC solution (2 ml) was added. Thereby, Catalyst Solution was obtained.

Production Example 17

Synthesis of Polymer (a)

A 3-L pressure-resistant stainless-steel vessel was purged with nitrogen. Cyclohexane (1800 ml), butadiene (0.75 g), Monomer Solution (a) (0.23 mmol), and a TIBA solution (1 ml) were put into the vessel and stirred. After 10 minutes, Catalyst Solution (2 ml) was added thereto, and the mixture was stirred while the temperature was kept at 40° C. After 3 hours, part (about 50 ml) of the reaction solution was taken from the reaction vessel, and thereby a solution of Intermediate (a) was obtained. Monomer solution (a) (0.02 mmol) was added to the reaction vessel, and the stirring was continued. After 2 hours, 0.01 M BHT in isopropanol (10 ml) was dropwise added to terminate the reaction. The reaction solution and the solution of Intermediate (a) each were coagulated in an equal volume of methanol which was separately prepared, and thereby precipitates were obtained. Each of the precipitates was air-dried for 1 night and further dried under reduced pressure for 2 days, and thereby Polymer (a) (about 73 g) and Intermediate (a) (2 g) were obtained. Polymer (a) had a weight average molecular weight of $34 \times 10^4$ and an Mw/Mn=2.7.

Production Example 18

Synthesis of Polymer (b)

A 3-L pressure-resistant stainless-steel vessel was purged with nitrogen. Cyclohexane (1800 ml), butadiene (75 g), Monomer Solution (a) (5.91 mmol), and a TIBA solution (1 ml) were put into the vessel and stirred. After 10 minutes, Catalyst Solution (2 ml) was added thereto, and the mixture was stirred while the temperature was kept at 40° C. After 3 hours, part (about 50 ml) of the reaction solution was taken from the reaction vessel, and thereby a solution of Intermediate (b) was obtained. Monomer Solution (a) (1.17 mmol) was added to the reaction vessel, and the stirring was continued. After 2 hours, 0.01 M BHT in isopropanol (10 ml) was dropwise added to terminate the reaction. The reaction solution and the solution of Intermediate (b) each were coagulated in an equal volume of methanol which was separately prepared, and thereby precipitates were obtained. Each of the precipitates was air-dried for 1 night and further dried under reduced pressure for 2 days, and thereby Polymer (b) (about 72 g) and Intermediate (b) (2 g) were obtained. Polymer (b) had a weight average molecular weight of $34 \times 10^4$ and an Mw/Mn=2.7.

Production Example 19

Synthesis of Polymer (c)

A 3-L pressure-resistant stainless-steel vessel was purged with nitrogen. Cyclohexane (1800 ml), butadiene (75 g), Monomer Solution (b) (30.6 mmol), and a TIBA solution (1 ml) were put into the vessel and stirred. After 10 minutes, Catalyst Solution (2 ml) was added thereto, and the mixture was stirred while the temperature was kept at 40° C. After 3 hours, part (about 50 ml) of the reaction solution was taken from the reaction vessel, and thereby a solution of Intermediate (c) was obtained. Monomer Solution (b) (41.7 mmol) was added to the reaction vessel, and the stirring was continued. After 2.5 hours, 0.01 M BHT in isopropanol (10 ml) was dropwise added to terminate the reaction. The reaction solution and the solution of Intermediate (c) each were coagulated in an equal volume of methanol which was separately prepared, and thereby precipitates were obtained. Each of the precipitates was air-dried for 1 night and further dried under reduced pressure for 2 days, and thereby Polymer (c) (about 71 g) and Intermediate (c) (2 g) were obtained. Polymer (c) had a weight average molecular weight of $42 \times 10^4$ and an Mw/Mn=2.8.

Production Example 20

Synthesis of Polymer (d)

A 3-L pressure-resistant stainless-steel vessel was purged with nitrogen. Cyclohexane (1800 ml), butadiene (75 g), Monomer Solution (b) (3.87 mmol), and a TIBA solution (1 ml) were put into the vessel and stirred. After 10 minutes, Catalyst Solution (2 ml) was added thereto, and the mixture was stirred while the temperature was kept at 40° C. After 3 hours, part (about 50 ml) of the reaction solution was taken from the reaction vessel, and thereby a solution of Intermediate (d) was obtained. Monomer Solution (a) (1.17 mmol) was added to the reaction vessel, and the stirring was continued. After 2 hours, 0.01 M BHT in isopropanol (10 ml) was dropwise added to terminate the reaction. The reaction solution and the solution of Intermediate (d) each were coagulated in an equal volume of methanol which was separately prepared, and thereby precipitates were obtained. Each of the precipitates was air-dried for 1 night and further dried under reduced pressure for 2 days, and thereby Polymer (d) (about 72 g) and Intermediate (d) (2 g) were obtained. Polymer (d) had a weight average molecular weight of $38 \times 10^4$ and an Mw/Mn=2.8.

Production Example 21

Synthesis of Polymer (e)

A 3-L pressure-resistant stainless-steel vessel was purged with nitrogen. Cyclohexane (1800 ml), butadiene (75 g), Monomer Solution (b) (3.87 mmol), and a TIBA solution (1 ml) were put into the vessel and stirred. After 10 minutes, Catalyst Solution (2 ml) was added thereto, and the mixture was stirred while the temperature was kept at 40° C. After 3 hours, part (about 50 ml) of the reaction solution was taken from the reaction vessel, and thereby a solution of Intermediate (e) was obtained. Monomer Solution (b) (1.93 mmol) was added to the reaction vessel, and the stirring was continued. After 2 hours, 0.01 M BHT in isopropanol (10 ml) was dropwise added to terminate the reaction. The reaction solution and the solution of Intermediate (e) each were coagulated in an equal volume of methanol which was separately prepared, and thereby precipitates were obtained. Each of the precipitates was air-dried for 1 night and further dried under reduced pressure for 2 days, and thereby Polymer (e) (about 72 g) and Intermediate (e) (2 g) were obtained. Polymer (e) had a weight average molecular weight of $38 \times 10^4$ and an Mw/Mn=2.8.

Production Example 22

Synthesis of Polymer (f)

A 3-L pressure-resistant stainless-steel vessel was purged with nitrogen. Cyclohexane (1800 ml), butadiene (75 g), Monomer Solution (b) (3.87 mmol), and a TIBA solution (1 ml) were put into the vessel and stirred. After 10 minutes, Catalyst Solution (2 ml) was added thereto, and the mixture was stirred while the temperature was kept at 40° C. After 3 hours, part (about 50 ml) of the reaction solution was taken from the reaction vessel, and thereby a solution of Intermediate (f) was obtained. Monomer Solution (b) (1.03 mmol) and Monomer (c) (0.9 mmol) were added to the reaction vessel, and the stirring was continued. After 2 hours, 0.01 M BHT in isopropanol (10 ml) was dropwise added to terminate the reaction. The reaction solution and the solution of Intermediate (f) each were coagulated in an equal volume of methanol which was separately prepared, and thereby precipitates were obtained. Each of the precipitates was air-dried for 1 night and further dried under reduced pressure for 2 days, and thereby Polymer (f) (about 72 g) and Intermediate (f) (2 g) were obtained. Polymer (f) had a weight average molecular weight of $42 \times 10^4$, and an Mw/Mn=2.7.

Each of Polymers (a) to (f) and Intermediates (a) to (f) was subjected to the $^1$H-NMR measurement and $^{13}$C-NMR measurement; Table 1 shows the results (content of polar group-containing vinyl compound and cis content).

These results also show that Polymers (a) to (f) each have the structural units A and B, and that the unit A exists at an end portion.

TABLE 1

|  | (a) | (b) | (c) | (d) | (e) | (f) |
|---|---|---|---|---|---|---|
| Polymer |  |  |  |  |  |  |
| Content of polar group-containing vinyl compound (% by mass) | 0.05 | 1.05 | 6.67 | 0.89 | 0.92 | 0.93 |
| C is content (mol %)* | 98.6 | 97.9 | 96.8 | 98.2 | 97.5 | 97.4 |
| Intermediate |  |  |  |  |  |  |
| Content of polar group-containing vinyl compound (% by mass) | 0.04 | 0.95 | 4.05 | 0.78 | 0.81 | 0.77 |

*Mole fraction of butadiene units

Production Example 23

Synthesis of Polymer (g)

A 3-L pressure-resistant stainless-steel vessel was purged with nitrogen. Cyclohexane (1800 ml), butadiene (75 g), and a TIBA solution (1 ml) were put into the vessel and stirred. After 10 minutes, Catalyst Solution (2 ml) was added thereto, and the mixture was stirred while the temperature was kept at 40° C. After 3 hours, 0.01 M BHT in isopropanol (10 ml) was dropwise added to terminate the reaction. The reaction solution was coagulated in an equal volume of methanol which was separately prepared, and thereby a precipitate was obtained. Each precipitate was air-dried for 1 night and further dried under reduced pressure for 2 days. Thereby, Polymer (g) (about 75 g) was obtained. Polymer (g) had a weight average molecular weight of $40 \times 10^4$ and an Mw/Mn=2.3. The $^{13}$C-NMR measurement showed that Polymer (g) had a cis content of butadiene units of 98.0%.

Production Example 24

Synthesis of Amine Monomer Solution

A 200-cc glass vessel was purged with nitrogen. Cyclohexane (40 ml) and Amine Monomer (30 mmol) were put into the vessel and stirred. Further, a TIBA solution (80 ml) was dropwise added thereto. After the dropwise addition was finished, the mixture was stirred for 30 minutes at room temperature. The obtained solution was stored in a refrigerator while the nitrogen atmosphere was maintained under the light-shielding condition.

Production Example 25

Synthesis of Catalyst Solution (A)

A 50-ml glass vessel was purged with nitrogen. Butadiene in cyclohexane (8 ml, 2.0 mol/L), a neodymium ethylhexanoate/toluene solution (1 ml, 0.2 mol/L), and PMAO (8 ml) were put into the vessel and stirred. After 5 minutes, a DIBAH solution (5 ml) was added; and after another 5 minutes, a DEAC solution (2 ml) was added. Thereby, Catalyst Solution (A) was obtained.

Production Example 26

Synthesis of Polymer (A)

A reaction vessel (3-L pressure-resistant stainless-steel vessel) was purged with nitrogen. Cyclohexane (1800 ml), butadiene (75 g), a TIBA solution (1 ml), and Amine Monomer Solution (22.8 ml) were put into the vessel while the nitrogen atmosphere was maintained and the vessel was hermetically sealed. The mixture was stirred for 5 minutes, and then Catalyst Solution (A) (1.5 ml) was added. Thereafter, the mixture was stirred while the temperature was kept at 30° C. After 3 hours, 0.01 M BHT in isopropanol (10 ml) was dropwise added to the reactor vessel, and thereby the reaction was terminated. The reaction solution was cooled down and then added to methanol (3 L) separately prepared. The obtained precipitate was air-dried for 1 night, and further dried under reduced pressure for 2 days. Thereby, Polymer (A) was obtained. The yield was about 74.2 g. The analysis showed that the obtained Polymer (A) had a weight average molecular weight of $59.5 \times 10^4$, an Mw/Mn of 2.6, a cis content of butadiene units of 99.0 mol %, and an Amine Monomer content of 0.28 mol % (0.65% by mass).

Production Example 27

Synthesis of Polymer (B)

Except that Silane Monomer (A) (0.80 ml, 2.75 mmol) was used instead of Amine Monomer Solution, the same operation was performed as in Production Example 26. Thereby, Polymer (B) was obtained. The yield was about 71.4 g. The analysis showed that the obtained Polymer (B) had a weight average molecular weight of $55.4 \times 10^4$, an Mw/Mn of 2.9, a cis content of butadiene units of 98.7 mol %, and a Silane Monomer (A) content of 0.18 mol % (0.77% by mass).

Production Example 28

Synthesis of Polymer (C)

Except that Silane Monomer (B) (0.73 ml, 2.76 mmol) was used instead of Amine Monomer Solution, the same operation was performed as in Production Example 26.

Thereby, Polymer (C) was obtained. The yield was about 71.4 g. The analysis showed that the obtained Polymer (C) had a weight average molecular weight of $59.8 \times 10^4$, an Mw/Mn of 3.1, a cis content of butadiene units of 98.9 mol %, and a Silane Monomer (B) content of 0.18 mol % (0.85% by mass).

Production Example 29

Synthesis of Polymer (D)

Except that no Amine Monomer Solution was used, the same operation was performed as in Production Example 26. Thereby, Polymer (D) was obtained. The yield was about 73.5 g. The analysis showed that the obtained Polymer (D) had a weight average molecular weight of $52.8 \times 10^4$, an Mw/Mn of 2.5, and a cis content of butadiene units of 99.2 mol %.

Examples 1 to 23 and Comparative Examples 1 to 7

The following will describe the chemicals used in the examples and comparative examples.

NR: natural rubber (TSR 20)
BR: high-cis BR150B (Ube Industries, Ltd.)
Polymers: prepared in the above production examples
Carbon black: SHOBLACK N220 (nitrogen adsorption specific surface area ($N_2SA$): 125 $m^2$/g, Cabot Japan K.K.)
Silica: ULTRASIL VN3 (nitrogen adsorption specific surface area ($N_2SA$): 175 $m^2$/g, Degussa)
Silane coupling agent: Si69 (bis(3-triethoxysilylpropyl)tetrasulfide, Degussa)
Antioxidant: NOCRAC 6C(N-1,3-dimethylbutyl-N'-phenyl-p-phenylenediamine, Ouchi Shinko Chemical Industrial Co., Ltd.)
Stearic acid: stearic acid (NOF CORPORATION)
Oil: mineral oil PW-380 (Idemitsu Kosan Co., Ltd.)
Zinc oxide: zinc white #1 (Mitsui Mining & Smelting Co., Ltd.)
Wax: SUNNOC WAX (Ouchi Shinko Chemical Industrial Co., Ltd.)
Sulfur: powdery sulfur (Tsurumi Chemical Industry Co., Ltd.)
Vulcanization accelerator 1: NOCCELER CZ (N-cyclohexyl-2-benzothiazolylsulfenamide, Ouchi Shinko Chemical Industrial Co., Ltd.)
Vulcanization accelerator 2: NOCCELER D (N,N'-diphenylguanidine, Ouchi Shinko Chemical Industrial Co., Ltd.)

The ingredients were mixed and kneaded according to the formulations shown in Tables 2 to 4, and the respective rubber compositions for test were obtained. These compositions were press-vulcanized for 20 minutes at 170° C. to provide vulcanized products. These products were evaluated on performance on ice, driving stability on dry roads, and abrasion resistance by the following test methods.

(Dynamic Viscoelasticity Test (Evaluation on Performance on Ice and Driving Stability on Dry Roads))

The elastic modulus (0.1% $G^*$) at a temperature of 0° C., a frequency of 5 Hz, and an amplitude of 0.1%, and the value ($\Delta G^*$) obtained by subtracting the value of 0.1% $G^*$ from the value of the elastic modulus (40% $G^*$) at an amplitude of 40% were measured using a viscoelasticity measurement tester (TA Instruments).

As the index of the balance between the performance on ice and the handling stability, the index s (s satisfies 0<s<1) represented by the formula:

$$s = (\Delta G^*)/(0.1\% \, G^*)$$

was used. The results are shown relative to the value of Comparative Example 1, 4, or 7 taken as 100. The smaller the value s is, the better the balance between the performance on ice and the handling stability is.

(Lambourn Abrasion Test)

The volume loss of each vulcanized rubber sample was measured using a Lambourn abrasion tester (Iwamoto Seisakusho Co., Ltd.) under the conditions: a temperature of 20° C., test time of 5 minutes, test surface speed of 80 m/min., dropped sand amount of 15 g/min., load of 3.0 kgf, and slip ratio of 20%. The values in Table 2 are relative values with the volume loss of Comparative Example 1 taken as 100. A larger value means better abrasion resistance.

(LAT Abrasion Test)

The volume loss of each vulcanized rubber sample was measured using a LAT tester (Laboratory Abrasion and Skid Tester) under the conditions: a load of 50 N, speed of 20 km/h, and slip angle of 5°. The values in Tables 2 to 4 are relative values with the volume loss of Comparative Example 1, 4 or 7 taken as 100. A larger value means better abrasion resistance.

TABLE 2

|  | Examples | | | | | | | | Comparative Examples | | |
| --- | --- | --- | --- | --- | --- | --- | --- | --- | --- | --- | --- |
|  | 1 | 2 | 3 | 4 | 5 | 6 | 7 | 8 | 1 | 2 | 3 |
| NR | 50 | 50 | 50 | 50 | 50 | 50 | 50 | 50 | 50 | 50 | 50 |
| BR | 10 | 10 | 10 | 10 | 10 | 10 | 10 | 40 | 50 | 10 | 10 |
| Polymer No. | (2) | (3) | (4) | (5) | (6) | (7) | (2) | (2) | — | (1) | (8) |
| Amount | 40 | 40 | 40 | 40 | 40 | 40 | 40 | 10 | — | 40 | 40 |
| Carbon black | 20 | 20 | 20 | 20 | 20 | 20 | 5 | 20 | 20 | 60 | 20 |
| Silica | 40 | 40 | 40 | 40 | 40 | 40 | 130 | 40 | 40 | 5 | 40 |
| Silane coupling agent | 3 | 3 | 3 | 3 | 3 | 3 | 3 | 3 | 3 | 3 | 3 |
| Antioxidant | 2 | 2 | 2 | 2 | 2 | 2 | 2 | 2 | 2 | 2 | 2 |
| Stearic acid | 1 | 1 | 1 | 1 | 1 | 1 | 1 | 1 | 1 | 1 | 1 |
| Oil | 25 | 25 | 25 | 25 | 25 | 25 | 55 | 25 | 25 | 25 | 25 |
| Zinc oxide | 1.5 | 1.5 | 1.5 | 1.5 | 1.5 | 1.5 | 1.5 | 1.5 | 1.5 | 1.5 | 1.5 |
| Wax | 1 | 1 | 1 | 1 | 1 | 1 | 1 | 1 | 1 | 1 | 1 |
| Sulfur | 1 | 1 | 1 | 1 | 1 | 1 | 1 | 1 | 1 | 1 | 1 |
| Vulcanization accelerator 1 | 1.5 | 1.5 | 1.5 | 1.5 | 1.5 | 1.5 | 1.5 | 1.5 | 1.5 | 1.5 | 1.5 |
| Vulcanization accelerator 2 | 1 | 1 | 1 | 1 | 1 | 1 | 1 | 1 | 1 | 1 | 1 |
| Index s | 81 | 79 | 93 | 89 | 92 | 93 | 86 | 96 | 100 | 104 | 77 |
| Lam bourn | 101 | 99 | 98 | 98 | 98 | 101 | 97 | 100 | 100 | 101 | 74 |
| LAT | 99 | 98 | 101 | 99 | 98 | 99 | 98 | 98 | 100 | 99 | 73 |

As shown in Table 2, the value of s was small but the values of Lambourn and LAT were too small in Comparative Example 3. In contrast, in Examples 1 to 8, the value of s was smaller than in Comparative Examples 1 and 2 and the indexes of Lambourn and LAT were larger than in Comparative Example 3. These results show that blending of a hydroxy group-containing copolymer, which is prepared with a hydroxy group-containing monomer and has a high cis content of butadiene units, causes good balance of performance on ice and handling stability while maintaining abrasion resistance.

TABLE 3

|  | Examples | | | | | | | | | Comparative Examples | |
|---|---|---|---|---|---|---|---|---|---|---|---|
|  | 9 | 10 | 11 | 12 | 13 | 14 | 15 | 16 | 17 | 4 | 5 |
| NR | 50 | 50 | 50 | 50 | 50 | 50 | 50 | 50 | 50 | 50 | 50 |
| BR | 10 | 10 | 10 | 10 | 10 | 10 | 35 | 5 | 10 | 10 | 10 |
| Polymer No. | (a) | (b) | (b) | (c) | (d) | (e) | (e) | (e) | (f) | (g) | (g) |
| Amount | 40 | 40 | 70 | 40 | 40 | 40 | 15 | 45 | 40 | 40 | 40 |
| Carbon black | 15 | 15 | 15 | 15 | 15 | 90 | 15 | 5 | 15 | 15 | 15 |
| Silica | 45 | 45 | 45 | 45 | 45 | 15 | 45 | 100 | 45 | 45 | 45 |
| Silane coupling agent | 4 | 4 | 4 | 4 | 4 | 1.5 | 4 | 10 | 4 | 4 | 4 |
| Antioxidant | 2 | 2 | 2 | 2 | 2 | 2 | 2 | 2 | 2 | 2 | 2 |
| Stearic acid | 1 | 1 | 1 | 1 | 1 | 1 | 1 | 1 | 1 | 1 | 1 |
| Oil | 25 | 25 | 25 | 25 | 25 | 45 | 25 | 50 | 25 | 25 | 30 |
| Zinc oxide | 1.5 | 1.5 | 1.5 | 1.5 | 1.5 | 1.5 | 1.5 | 1.5 | 1.5 | 1.5 | 1.5 |
| Wax | 1 | 1 | 1 | 1 | 1 | 1 | 1 | 1 | 1 | 1 | 1 |
| Sulfur | 1 | 1 | 1 | 1 | 1 | 1 | 1 | 1 | 1 | 1 | 1 |
| Vulcanization accelerator 1 | 1.5 | 1.5 | 1.5 | 1.5 | 1.5 | 1.5 | 1.5 | 1.5 | 1.5 | 1.5 | 1.5 |
| Vulcanization accelerator 2 | 1 | 1 | 1 | 1 | 1 | 1 | 1 | 1 | 1 | 1 | 1 |
| Index s | 84 | 64 | 53 | 85 | 64 | 93 | 82 | 83 | 62 | 100 | 96 |
| LAT | 110 | 110 | 125 | 123 | 112 | 105 | 103 | 104 | 112 | 100 | 88 |

As shown in Table 3, the value of s was small but the value of LAT was too small in Comparative Example 5. In contrast, in Examples 9 to 17, the value of s was smaller and the index of LAT was larger than in Comparative Examples 4 and 5. These results show that blending of a hydroxy group-containing copolymer, which is prepared with a hydroxy group-containing monomer, has a structural unit A containing 50% by mass or more of the monomer introduced into an end portion thereof, and has a high cis content of butadiene units, causes good balance of performance on ice and handling stability while maintaining abrasion resistance.

Comparative Example 6. These results show that use of an amine monomer or a silane monomer causes good balance of performance on ice and handling stability while maintaining abrasion resistance.

The present application claims priority to Patent Application Nos. 2009-093407 filed in Japan on Apr. 7, 2009, 2009-166085 filed in Japan on Jul. 14, 2009, and 2009-281011 filed in Japan on Dec. 10, 2009 under the Paris Convention and provisions of national law in a designated State, the entire contents of which are hereby incorporated by reference.

TABLE 4

|  | Examples | | | | | | Comparative Examples | |
|---|---|---|---|---|---|---|---|---|
|  | 18 | 19 | 20 | 21 | 22 | 23 | 6 | 7 |
| Polymer No. | (A) | | | (B) | | (C) | | (D) |
| Amount | 50 | 50 | 50 | 20 | 50 | 50 | 50 | — |
| NR | 50 | 50 | 50 | 50 | 50 | 50 | 50 | 50 |
| BR | — | — | — | 30 | — | — | — | 50 |
| Carbon black | 10 | 5 | 10 | 10 | 10 | 5 | 10 | 10 |
| Silica | 50 | 80 | 50 | 50 | 50 | 80 | 50 | 50 |
| Silane coupling agent | 5 | 8 | 5 | 5 | 5 | 8 | 5 | 5 |
| Oil | 2 | 2 | 2 | 2 | 2 | 2 | 2 | 2 |
| Antioxidant | 2 | 2 | 2 | 2 | 2 | 2 | 2 | 2 |
| Stearic acid | 25 | 25 | 25 | 25 | 25 | 25 | 25 | 25 |
| Zinc oxide | 1.5 | 1.5 | 1.5 | 1.5 | 1.5 | 1.5 | 1.5 | 1.5 |
| Wax | 1 | 1 | 1 | 1 | 1 | 1 | 1 | 1 |
| Sulfur | 1 | 1 | 1 | 1 | 1 | 1 | 1 | 1 |
| Vulcanization accelerator 1 | 1.5 | 1.5 | 1.5 | 1.5 | 1.5 | 1.5 | 1.5 | 1.5 |
| Vulcanization accelerator 2 | 1 | 1 | 1 | 1 | 1 | 1 | 1 | 1 |
| Index s | 94 | 96 | 95 | 97 | 96 | 97 | 101 | 100 |
| LAT | 110 | 113 | 109 | 104 | 111 | 108 | 109 | 100 |

As shown in Table 4, the index of s was small and the index of LAT was large so that good performance was achieved in Examples 18 to 23. In contrast, the index of LAT was large but the index of s was also large so that the balance was poor in

The invention claimed is:

1. A polar group-containing copolymer obtainable by copolymerizing a conjugated diene compound and a polar group-containing vinyl compound, wherein a cis content of a double bond portion of the conjugated diene compound in the polar group-containing copolymer is 80 mol % or more, and wherein the polar group-containing vinyl compound is a compound represented by formula (I):

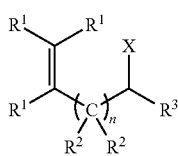

wherein $R^1$s each are hydrogen, a vinyl group, or a C1-C3 aliphatic hydrocarbon group, and may be the same as or different from each other; $R^2$s each are hydrogen or a C1-C3 aliphatic hydrocarbon group and may be the same as or different from each other; $R^3$ is hydrogen or a C1-C8 aliphatic or alicyclic hydrocarbon group; X is a hydroxy group, —$NR_2$, or a group represented by —Si$(OR)_k(R)_{3-k}$ wherein Rs each are hydrogen or a C1-C8 hydrocarbon group and may be the same as or different from each other; and k is an integer of 1, 2, or 3; n is an integer of 1 to 10; and the $R^1$, $R^2$, $R^3$, a carbon atom linked to the $R^2$, and/or a carbon atom linked to the $R^3$ may be bonded to each other to form a ring structure.

2. The polar group-containing copolymer according to claim 1, wherein the polar group-containing copolymer comprises:
0.1 to 20% by mass of a structural unit A comprising:
50% by mass or less of a unit derived from the conjugated diene compound and
50% by mass or more of a unit derived from the polar group-containing vinyl compound; and
80 to 99.9% by mass of a structural unit B comprising:
60% by mass or more of a unit derived from the conjugated diene compound and
40% by mass or less of a unit derived from the polar group-containing vinyl compound, and
wherein the polar group-containing copolymer has the structural unit A at its end.

3. The polar group-containing copolymer according to claim 1, which is obtainable by reacting the polar group-containing vinyl compound with an active end of an active end-containing copolymer that is obtainable by copolymerizing the conjugated diene compound and the polar group-containing vinyl compound using a transition metal-containing compound as a catalyst.

4. The polar group-containing copolymer according to claim 1,
wherein the polar group-containing copolymer has a weight average molecular weight of $1.0 \times 10^3$ to $2.0 \times 10^6$ and a content of the polar group-containing vinyl compound of 0.03 to 40% by mass.

5. The polar group-containing copolymer according to claim 1,
wherein the conjugated diene compound is 1,3-butadiene and/or isoprene.

6. The polar group-containing copolymer according to claim 1, which is obtainable by
reacting, before copolymerization, the polar group-containing vinyl compound with a compound represented by formula (II):

$$M(R^4)_m \qquad (II)$$

wherein M is aluminum, boron, silicon, or titanium; $R^4$s each are a C1-C8 aliphatic or alicyclic hydrocarbon group, a C1-C8 aliphatic or alicyclic alkoxy group, or a halogen, and may be the same as or different from each other; and m is an integer of 3 or 4, to produce a reaction product, and
copolymerizing the obtained reaction product with the conjugated diene compound.

7. The polar group-containing copolymer according to claim 1, which is obtainable by copolymerization using a lanthanide-, Ti-, Co-, or Ni-containing compound as a catalyst, and an Al- or B-containing compound as a promoter.

8. A rubber composition, comprising:
a diene rubber ingredient;
the polar group-containing copolymer according to claim 1; and
silica.

9. The rubber composition according to claim 8,
wherein an amount of the silica is 5 to 150 parts by mass relative to 100 parts by mass of a total of rubber ingredients, and an amount of the polar group-containing copolymer is 5 to 90% by mass in 100% by mass of a total of rubber ingredients.

10. The rubber composition according to claim 8 or 9, further comprising
carbon black in an amount of 5 to 150 parts by mass relative to 100 parts by mass of a total of rubber ingredients.

11. A winter tire, which is produced using the rubber composition according to claim 8.

* * * * *